US010760726B2

(12) United States Patent
Sprague

(10) Patent No.: US 10,760,726 B2
(45) Date of Patent: Sep. 1, 2020

(54) PIPE REPAIR COUPLING TOOL AND METHOD OF USE

(71) Applicant: Scott Sprague, Canby, OR (US)

(72) Inventor: Scott Sprague, Canby, OR (US)

( * ) Notice: Subject to any disclaimer, the term of this patent is extended or adjusted under 35 U.S.C. 154(b) by 345 days.

(21) Appl. No.: 15/660,814

(22) Filed: Jul. 26, 2017

(65) Prior Publication Data

US 2019/0032836 A1 Jan. 31, 2019

(51) Int. Cl.
*F16L 55/18* (2006.01)
*F16L 55/16* (2006.01)

(52) U.S. Cl.
CPC .......... *F16L 55/18* (2013.01); *F16L 55/1608* (2013.01)

(58) Field of Classification Search
CPC ....... F16L 55/18; F16L 55/1608; F16L 21/06; F16L 21/065
USPC .......................................... 285/15, 419, 420
See application file for complete search history.

(56) References Cited

U.S. PATENT DOCUMENTS

| D142,057 | S | 8/1945 | Baxter | |
| 4,111,234 | A | 9/1978 | Wells et al. | |
| 5,072,972 | A | 12/1991 | Justice | |
| 5,375,888 | A | 12/1994 | Ikeda | |
| 5,842,725 | A * | 12/1998 | Allert | F16L 21/06 |
| 6,270,124 | B1 * | 8/2001 | Nanko | 285/15 |
| 6,302,450 | B1 | 10/2001 | Dole et al. | |
| 7,896,399 | B1 * | 3/2011 | Orsini | F16L 55/18 |
| | | | | 285/15 |
| 8,172,277 | B2 | 5/2012 | Sarkisyan et al. | |
| 8,181,999 | B2 * | 5/2012 | Cromarty | 285/419 |
| 2006/0038397 | A1 | 2/2006 | Barrera | |
| 2010/0007139 | A1 | 1/2010 | Pirotin | |
| 2015/0267855 | A1 * | 9/2015 | Bradberry | 285/15 |

FOREIGN PATENT DOCUMENTS

WO    2014056054 A1    4/2014

OTHER PUBLICATIONS

Internet Screen Shot of a Caddy Pipe Clamp, https://www.walmart.com/ip/CADDY-454014-Superfix-Cushioned-Pipe-Clamp-Size-3-In/40729029, printed Jun. 29, 2017, 1 page.
Internet Screen Shot of a Hinged Pipe Clamp, http://www.mrsupply.com/wal-rich-hinged-pipe-clamp-2206002.html, printed Jun. 29, 2017, 2 pages.
Internet Screen Shot of an End of the Road Quick Fist Clamp, http://www.thefirestore.com/store/product.aspx/productId/10963/End-of-the-Road-Quick-Fist-Clamp/, printed Jun. 29, 2017, 1 page.

(Continued)

*Primary Examiner* — Zachary T Dragicevich
(74) *Attorney, Agent, or Firm* — Chernoff Vilhauer LLP

(57) ABSTRACT

A pipe repair tool and method of use, for use with a coupler of the type having a first end and a second end, the first end having an outwardly projecting flange, such that the repair tool includes a cuff portion having a leading edge and a trailing edge, the cuff engaging a sleeve portion of the coupler with the leading edge of the cuff facing the flange of the first end of the coupler. The tool may include an outwardly projecting first leading ear having a pry surface near the leading edge of the cuff, the pry surface facing the trailing edge of the cuff such that force applied to the pry surface urges the leading edge of the tool toward the flange of the first end of the coupler.

13 Claims, 5 Drawing Sheets

(56) References Cited

OTHER PUBLICATIONS

Internet Screen Shot of a 1×3 Worm Drive Clamp, http://www.usplastic.com/catalog/item.aspx?sku=24329&gclid=CjwKEAjwytLKBRCX547gve7EsE4SJAD3IZV6pzx6PR8rCOw8PHowgnyg2ykuehg1kvXibw3dXEj72RoCjPfw_wcB, printed Jun. 29, 2017, 2 pages.

Internet Screen Shot of a Butt Joint Exhaust Clamp, http://www.jegs.com/i/JEGS/555/30852/10002/-1?CAWELAID=1710650918&CAGPSPN=pla&CAAGID=39714413703&CATCI=pla-291718944609&CATARGETID=230006180039220957&cadevice=c&gclid=CjwKEAjwytLKBRCX547gve7EsE4SJAD3IZV6TmeKfkca7CXwx-5nZaY8fxZe1dd3C1Ow_GZNiNBdexoC-Wfw_wcB, printed Jun. 29, 2017, 4 pages.

Internet Screen Shot of "Plumbing Fixtures & Fittings," The Freedonia Group, Inc., https://www.freedoniagroup.com/inthenews/557622/plumbing-fixtures-fittings.htm, Sep. 2011, 4 pages.

\* cited by examiner

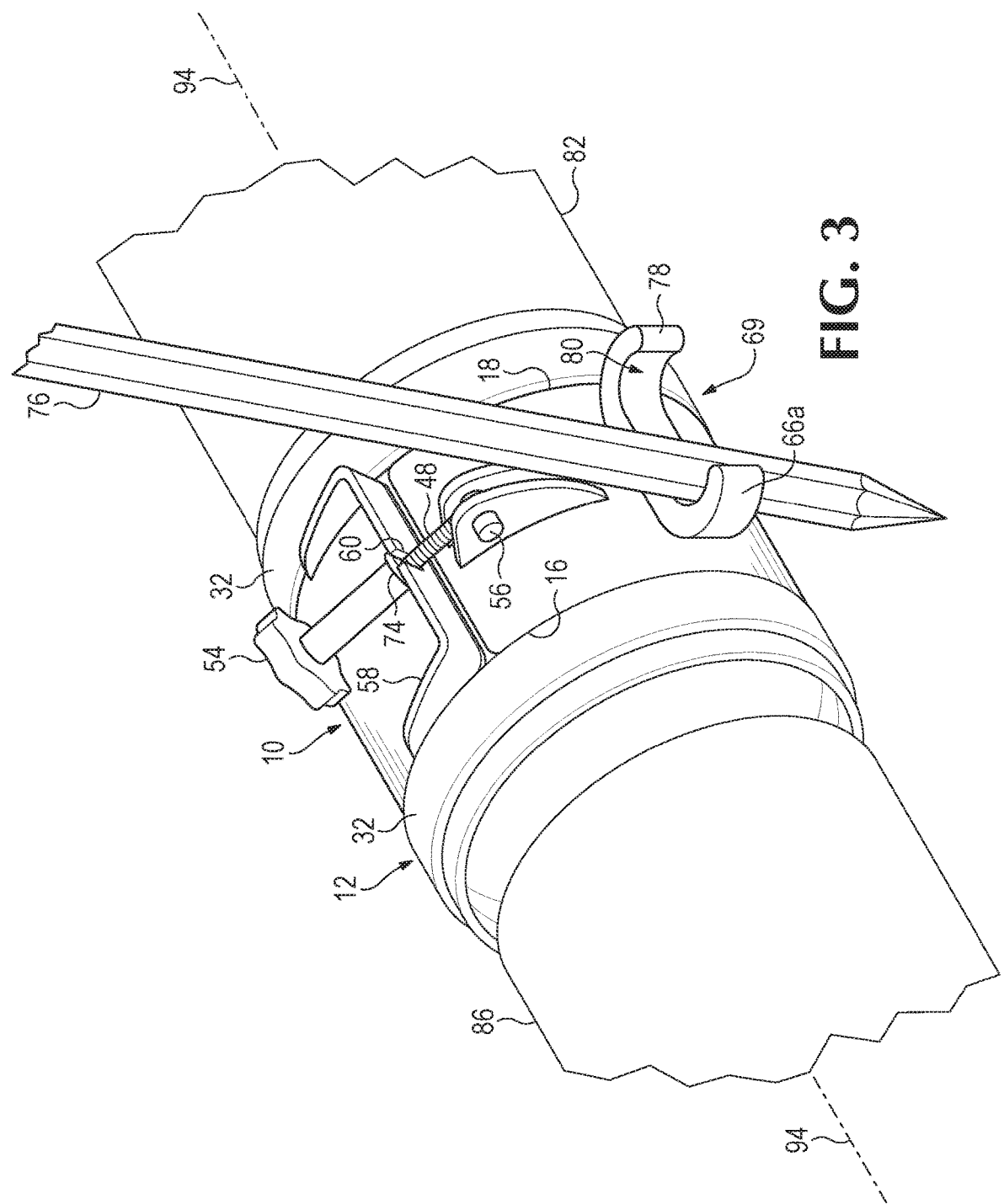

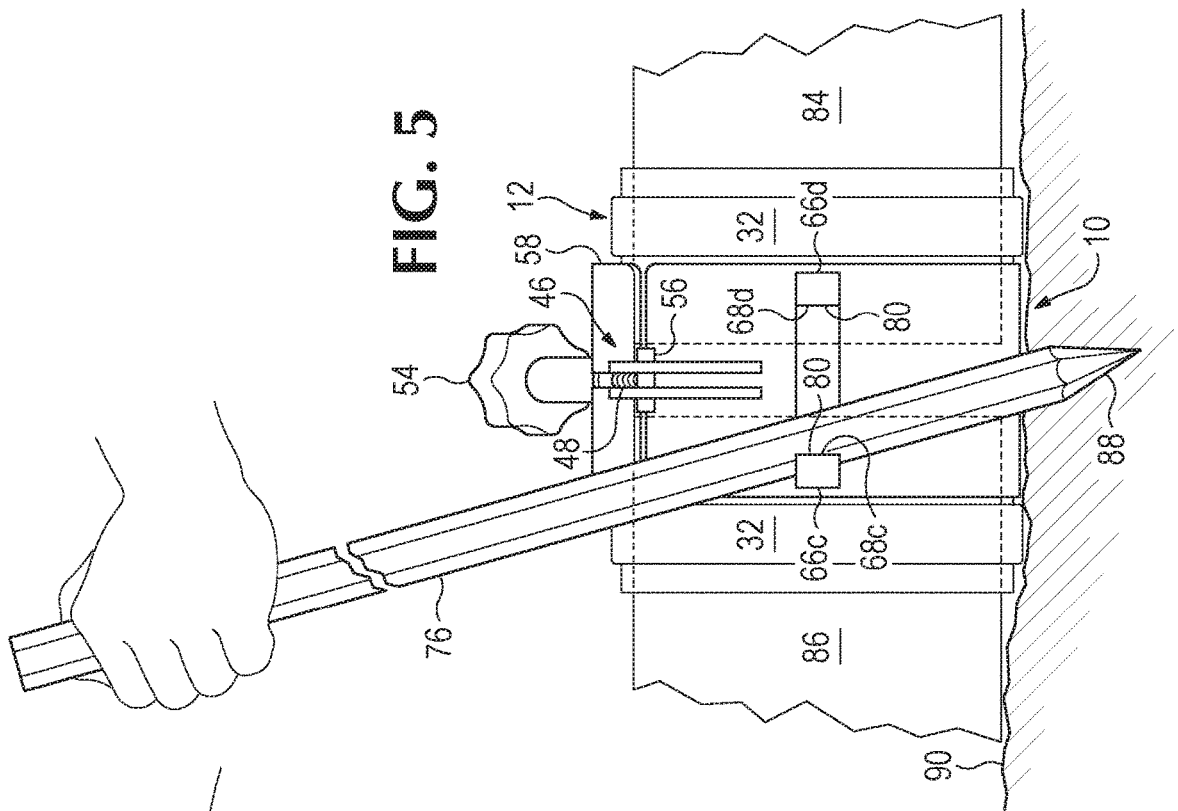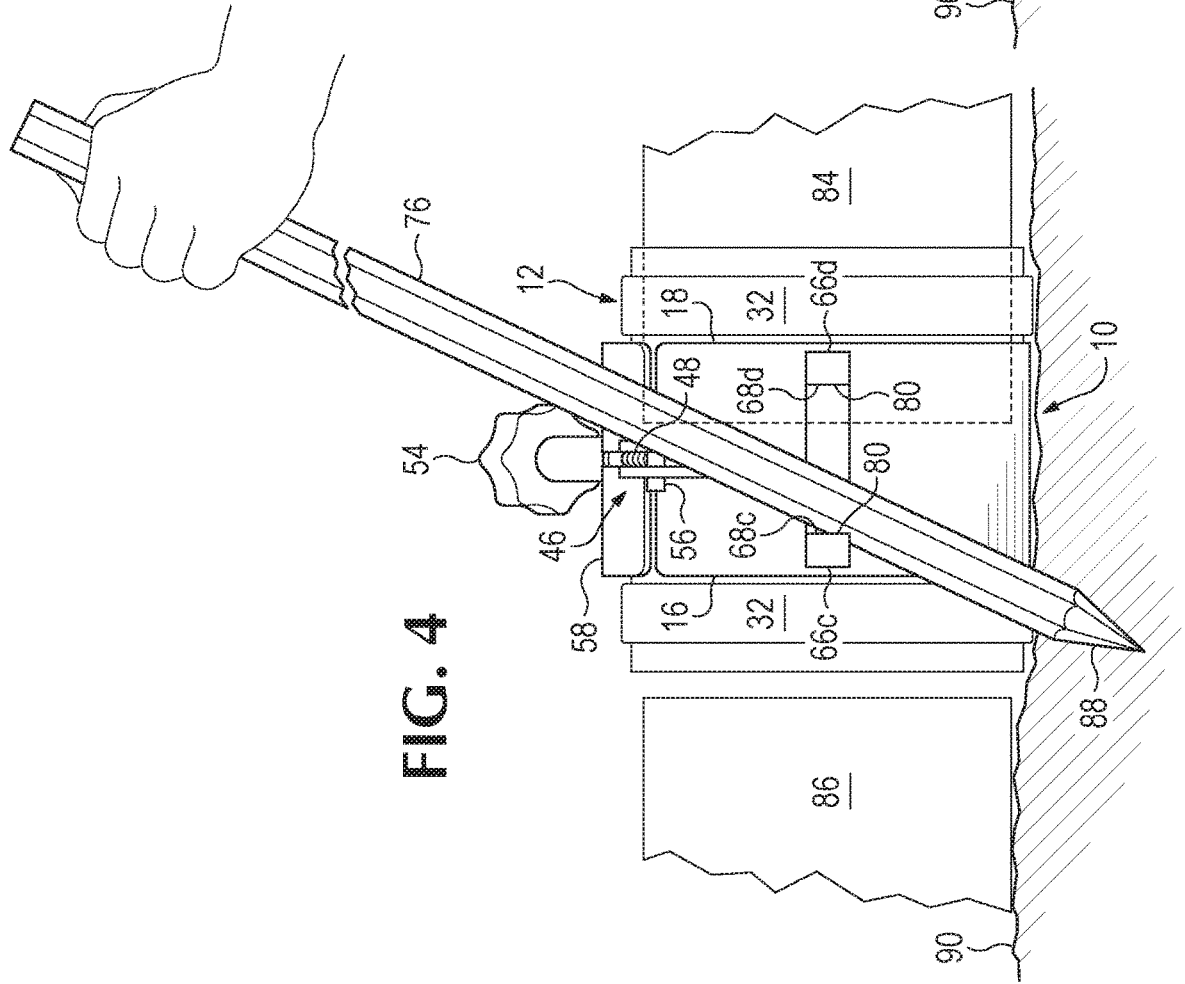

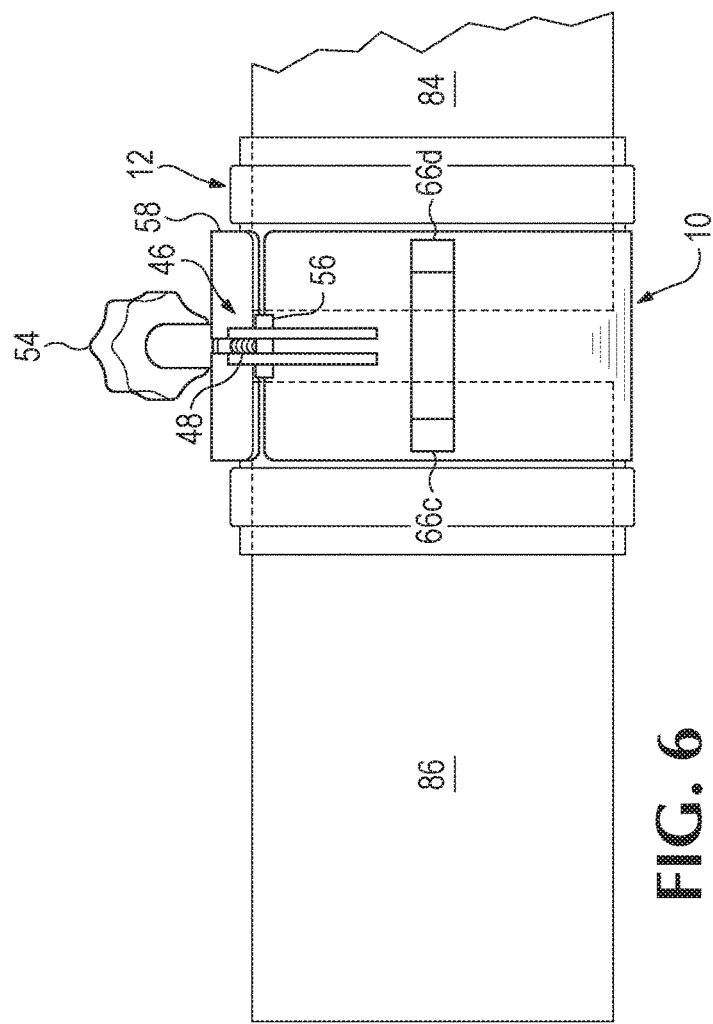
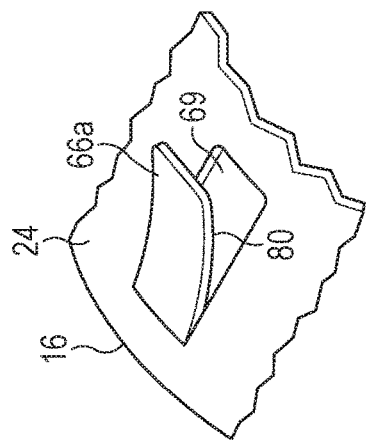
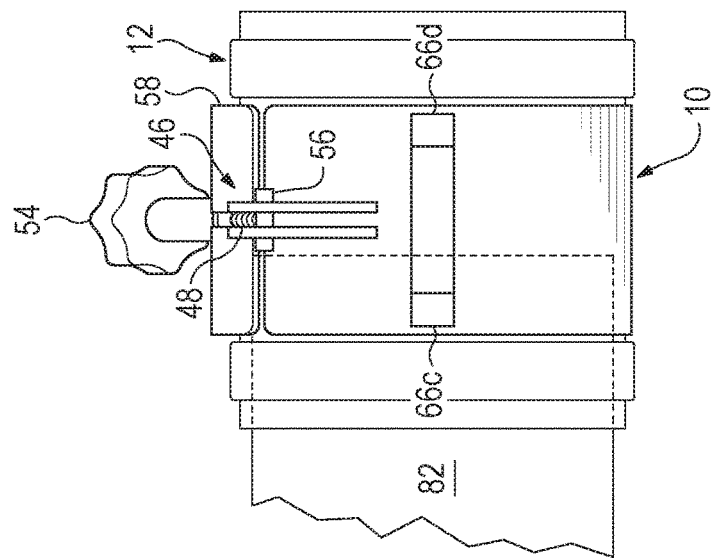
FIG. 6
FIG. 7

PIPE REPAIR COUPLING TOOL AND METHOD OF USE

BACKGROUND OF THE INVENTION

This application relates to a tool to aid in the repair of pipes. For example, to repair buried pipe, workers generally first excavate the surrounding soil and debris from the location of the damaged pipe. Following the excavation, the damaged portion of the pipe is cut away or otherwise removed, leaving two open ends of the original piping.

A pipe repair section, sized to fit the space between the open ends of the original piping, is secured to the original piping with a pair of couplers, one for each joint between the repair section and the original pipe. To accomplish the repair, a single coupler is slid onto each open end of the original piping. The repair section is placed between the exposed ends of the original pipe. Workmen then slide each coupler onto an end of the repair section so that each coupler spans both the replacement pipe section and the original pipe to create two airtight connections between the original pipe and the pipe repair section.

The conventional method to move the coupler onto the replacement pipe is to lubricate the ends of the exposed original pipe and the repair section and apply force to a narrow flange on the coupler, pushing the coupler flange onto the repair section. Pipe layers often use elongate pry bars with one end against a coupler to push the coupler onto the original pipe and then push it in the opposite direction onto the repair section. This can be difficult and often results in the pry bar slipping off the flange. One technique to prevent the pry bar from slipping off the flange of the coupler is to angle the pry bar with the point in the dirt directly underneath the pipe and the upper end of the pry angled outwardly away from the pipe. In this way the worker can apply both an inward force and forward force on the coupler. Applying an inward and forward force to only one side of the coupler can cock the coupler on a pipe, increasing the difficulty of sliding the coupler along the pipe. Thus, it sometimes takes two people, each with a pry bar, on opposite sides of the coupler to force the coupler along a pipe or across an intersection of two pipes.

Some of the difficulties associated with the repair process described above relate to the pry bar slipping off the coupler flange, the need to apply inward and forward force on the coupler with the pry bar, and the need for two workers, each with a pry bar to slide the coupler evenly from the original pipe onto the repair section. The difficulties can result in more workers spending more time in the trench and the increased risk of injury.

SUMMARY OF THE INVENTION

The invention described herein may be used by pipe layers that would allow for an easier, quicker, and safer method to repair a broken pipe.

In one embodiment, the present invention may include a pipe repair tool for use with a coupler of the type having a first end and a second end, the first end having an outwardly projecting flange, wherein the repair tool includes a cuff portion having a leading edge and a trailing edge, the cuff engaging a sleeve portion of the coupler with the leading edge of the cuff facing the flange of the first end of the coupler. This embodiment further includes an outwardly projecting first leading ear having a pry surface near the leading edge of the cuff, the pry surface facing the trailing edge of the cuff such that force applied to the pry surface urges the leading edge of the tool toward the flange of the first end of the coupler.

In another embodiment, the cuff portion may include a first outwardly projecting leading ear near to said leading edge of said cuff, wherein the projecting ear has a pocket with an open portion at least partially directed toward the trailing edge of the cuff such that a force applied to the pocket urges said leading edge of the cuff toward the flange of the first end of said coupler.

BRIEF DESCRIPTION OF THE DRAWINGS

For a better understanding of the invention, and to show how the same may be carried into effect, reference will now be made, by way of example, to the accompanying drawings, in which:

FIG. 3 is an isometric view of the repair tool shown in FIG. 1 in a closed position around a coupler, with the coupler positioned on an open end of the original pipe.

FIG. 4 is a side elevational view of the repair tool in a closed position around a coupler as shown in FIG. 3, with an end of a pry bar anchored in the earth and the shaft of the pry bar engaged with a pry surface on the repair tool.

FIG. 5 is a side elevational view of the pipe tool shown in FIGS. 3 and 4, with the coupler spanning the original pipe and replacement section.

FIG. 6 is a side elevational view of a first repair tool in a closed position around a first coupler surrounding an end of the original pipe, and a second repair tool in a closed position around a second coupler which is joining an end of the original pipe to the repair section.

FIG. 7 is an isometric cut-out view of an embodiment of an outwardly-projecting ear.

DETAILED DESCRIPTION

Figure 1:
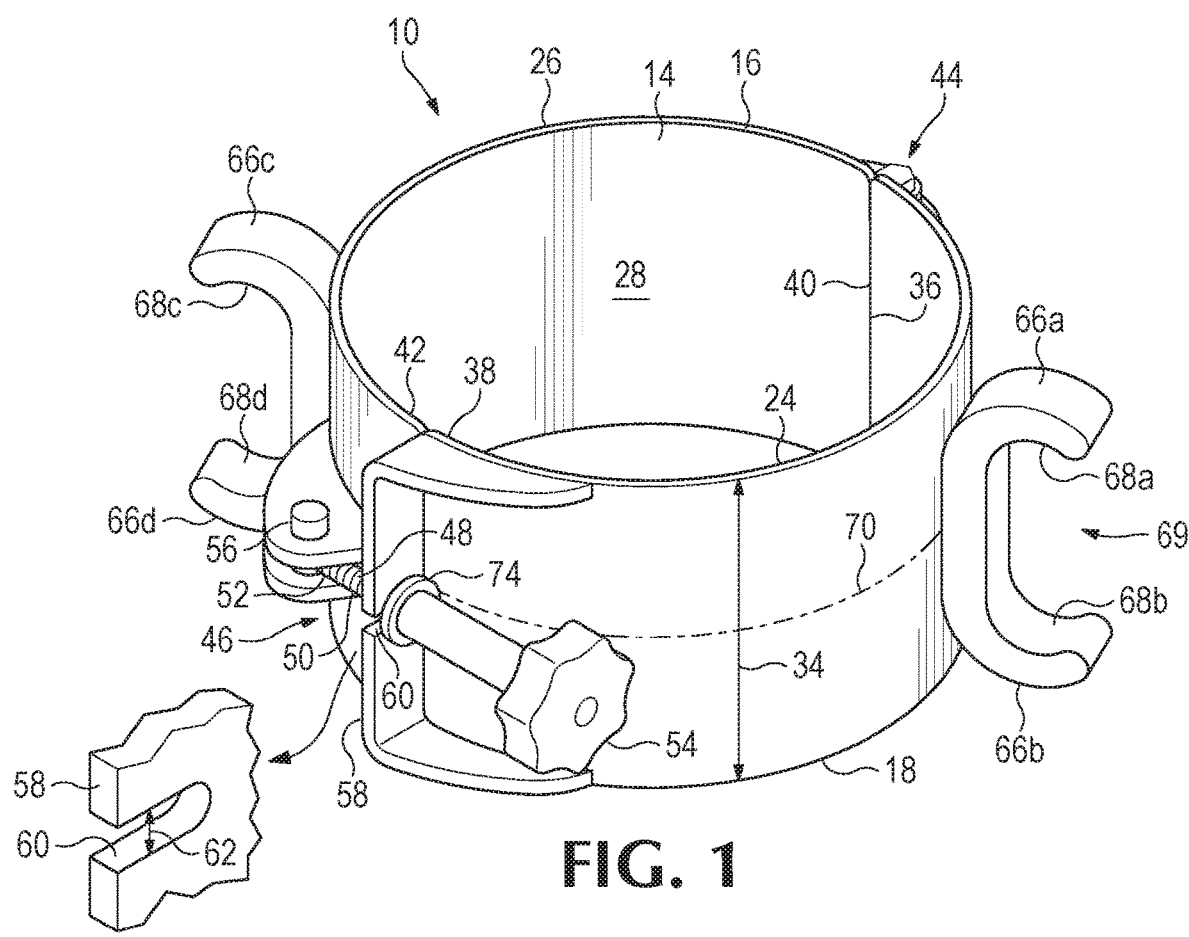
FIG. 1 is an isometric view of a pipe repair tool in a closed position.
Figure 2:
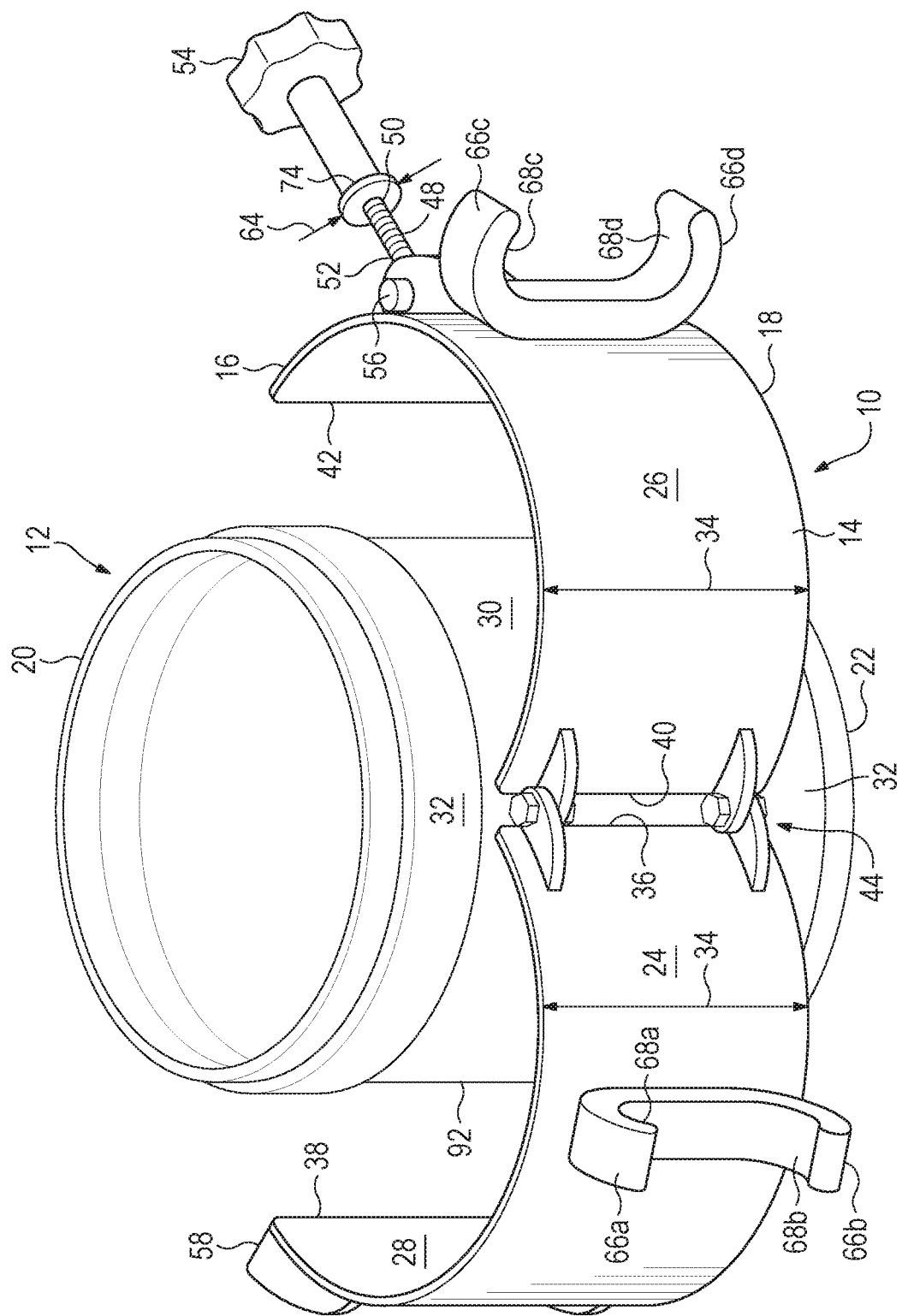
FIG. 2 is an isometric view of the repair tool of FIG. 1, in an open position, partially encircling a coupler.

Referring to the drawings, FIG. 1 shows a pipe repair tool 10 in a first, closed position. FIG. 2 shows the repair tool 10 in a second, open position, partially encircling a coupler 12. In one embodiment of the invention, the repair tool 10 includes a cuff 14, shown in FIG. 1 as having a substantially cylindrical shape with a leading edge 16 and a trailing edge 18 determined by the direction that the repair tool 10 will be moved by a user.

The coupler 12 may be of the type that is generally available for pipe repair use, and therefore may have a variety of shapes and sizes to accommodate a variety of pipes. In theory the repair tool would be capable of aiding in the repair of a pipe or other conduit of other-than-circular cross-section, but since most pipe is cylindrical, the drawings and description are directed toward a cylindrical conduit. The pipe to be repaired may be of any desired size including, but not limited to, 8 inch, 10 inch, or 12 inch diameter. The coupler 12 generally has a first end 20 and a second end 22. As shown in FIG. 2, the coupler 12 may have at least one raised circumferential flange 32 located proximate to the first and/or second ends 20, 22 of the coupler, and a body, which includes a cylindrical shaped sleeve 92, extending between the flanges 32, as best shown in FIG. 3.

In one embodiment of the invention, the cuff 14 may include a first cuff member 24 and a second cuff member 26, such that the first cuff member 24 has a first end 36 and a second end 38 and the second cuff member has a first end 40 and a second end 42. Each cuff member also has a depth 34, such that the member may surround at least a portion of the sleeve 92 of the coupler 12. In the embodiment shown herein, each cuff member 24, 26 has a partial-cylindrical shape with a combined inner surface 28 that corresponds to, or nearly corresponds to, the outer surface of the sleeve 92 that the cuff 14 is meant to be used with and/or surround. FIG. 3 shows an embodiment of the repair tool 10 surrounding and secured around a coupler 12, as will be described in more detail herein.

The first end of the first cuff member 36 may be attached to the first end of the second cuff member 40 by a joint 44 such as, but not limited to, one or more pivot joint or hinge joints. Such a joint 44 functions to maintain a connection between the first and second cuff members 24, 26 and allow for manual opening and closing of the cuff members 24, 26 relative to one another or to surround a coupler 12, as shown in FIGS. 1 and 2.

The second end of the first cuff member 38 and the second end of the second cuff member 42 may be selectively attached and/or tightened to each other using an appropriate latch mechanism 46. In the embodiment shown herein, the latch 46 includes an elongate threaded element 48 having a first end 50 and a second end 52. The first end of the elongate threaded element 48 includes a rotatable handle 54 that contains interior threading (not shown) complementary to the threads on the elongate threaded element 48. The second end of the elongate threaded element 52 is attached to the second cuff member 26 via a pivot connection 56 located near the second end 42 of the second cuff member.

A receiving lip 58 with a receiving slot 60 may also be included on the first cuff member 24. The receiving slot 60 may be sized to accept the elongate threaded element 48, as best viewable in FIGS. 1 and 3. The receiving slot 60 has a width 62 that is less than the diameter of the rotatable handle 64.

In use, the latch 46 functions to secure the repair tool 10 to the outer surface 30 of the coupler sleeve 92, as shown in FIGS. 3-6. First, the repair tool 10 is arranged in an open position such that the first and second cuff members 24, 26 can accept the coupler 12, as exemplified in FIG. 2. Then the first and second cuff members 24, 26 are positioned around the outer surface 30 of the coupler sleeve 92, next to one or between two circumferential flanges 32 of the coupler. The elongate threaded element 48 is then pivoted around the pivot connection 56 so that the threaded element is positioned within the receiving slot 60 in the receiving lip 58. The rotatable handle 54 is then rotated so that the end of the rotatable handle 74 is secured against the receiving lip 58 and receiving slot 60 and the cuff 14 snugly surrounds and engages the sleeve portion 92 of the coupler 12.

Other latch, joint, or attachment mechanisms are envisioned that function to attach cuff members, including, but not limited to, clamping mechanisms and locking mechanisms.

The cuff 14 may also include a single member of a resilient material (not shown), which a user may flex to fit around the coupler 12. The cuff 14 may also include first and second cuff members 24, 26 that are securable to each other with two or more latches 46, without a joint 44.

Although two cuff members are disclosed herein, this is not meant to limit the scope of the invention, since a cuff would operate to surround the sleeve of the coupler with more than two cuff members.

The pipe repair tool 10 may also include at least one outwardly projecting leading ear 66a having a force-receiving pry surface 68a. The leading ear 66a is located on the substantially cylindrical outer surface of the cuff 14, near the leading edge of the repair tool 16, with the associated pry surface 68a facing the trailing edge 18 of the repair tool. The ear 66a and the associated pry surface 68a are located on the outer surface 72 of the cuff 14 at a position between the midline 70 of the repair tool 10 and the leading edge 16. The midline 70 of the tool is generally located substantially equidistant between the leading edge 16 and trailing edge 18 of the repair tool 10. As used herein with respect to an outwardly projecting ear, the term "near" means nearer to the leading edge 16 of the cuff than the trailing edge 18 of the cuff, or vice versa. In the embodiment shown herein, the pry surface 68a may have a concave shape, or a turned back tip 78 or another configuration to form a pocket 80 having an open portion 69 facing the trailing edge of the tool 18. The pocket 80 may be beneficial to accept and guide a pry bar 76, the use of which will be described in more detail.

The pipe tool 10 may have an additional outwardly projecting leading ear 66c and outwardly projecting trailing ears 66b, 66d with associated pry surfaces 68c, 68b, 68d, as exemplified in the figures herein. 66c is the second leading ear located near the leading edge 16 of the cuff 14, 66b is the first trailing ear near the trailing edge 18 of the cuff, and 66d is the second trailing ear near the trailing edge 18 of the cuff 14. First and second leading ears 66a and 66c are substantially opposite each other near the leading edge 16 of the cuff 14, and trailing ears 66b and 66d are substantially opposite each other near the trailing edge 18 of cuff 14 when the cuff 14 is in a closed position as shown in FIG. 1. The projecting ears 66a-d are configured to withstand substantial force in the direction of the nearest coupler flange 32. The repair tool is preferably made of a strong, rigid material, or a strong semi-rigid material that will bend at least slightly to tighten around the coupler sleeve 92, including, but not limited to steel or aluminium.

The projecting ears 66a-d may also have different forms that securely provide a position which a bar 76 may be forced against, the process of which will be described in more detail herein. For instance, as shown in FIG. 7, the ear 66a may be a cut-out flap portion of the cuff 14 lifted away from the cuff to form a pocket 80 having an open portion 69, such that in operation the attached portion of the flap is near the leading edge 16, and the lifted portion is at least partially directed or facing toward the trailing edge of the cuff 18 (not shown). With the use of such an ear 66a, the lifted portion defines a pocket 80 which could function similarly to a pry surface. In another embodiment, the leading ears 66a, 66c and the trailing ears 66b, 66d may also extend beyond, or forward of, the leading and rearward of the trailing edges of the cuff 16, 18, respectively (not shown). In so positioning, the respective pry surfaces would also extend beyond the leading and trailing edges of the cuff 16, 18. When force is applied against the ear or associated pocket, depending upon the location of the ear relative to the depth of the associated flange 32, either the associated cuff edge 16, 18, or the ear 66a-d, may be forced toward the flange 32.

FIGS. 4-6 exemplify a method for joining first and second pipe sections 82, 84 using one or two couplers 12. FIG. 4 shows a pipe repair tool 10 secured to a coupler 12, encircling the open end of existing pipe 84 to be repaired. Lubricant of some kind may be applied to the inner surfaces of the coupler and/or the outer surface of the pipe to facilitate sliding the coupler 12 from the existing pipe 84 onto the repair section 86. The coupler 12 may have interior resilient gaskets near its first and second ends to create a tight seal with the pipe, which the lubricant may be applied to facilitate movement. In the view shown herein, the exemplary repair tool 10 has two outwardly projecting ears 66c, 66d and two pry surfaces 68c and 68d. The tips of the ears 66 could be turned back, forming bar-receiving pockets 80. First the user slides the coupler 12 onto the pipe section 84. Then the user may align the two pipe sections 82, 84 substantially coaxially. Following the preparatory arrangement and alignment, the user may then provide the pipe repair tool 10, and engage it with a coupler 12, as shown in FIG. 4. To move the coupler 12 to span both the pipe section 84 and the repair section 86, the user applies force to the pry surface 68c in the direction of the repair section 86. The user may do this by using a pry bar 78 and engaging the distal end of the bar 88 into the earth or surrounding environment 90, and applying force to the pry surface 68c by positioning the bar 76 into the pocket 80, and applying pressure to the bar 78 until the coupler 12 slides from the original pipe 84 partially onto the repair section 86 and couples the two pipes 84, 86 together.

FIG. 5 shows the position of the coupler 12 and associated repair tool 10 after the coupler 12 has been moved to span both the pipe section 84 and the repair section 86. Conversely, the user may move the coupler 12 in an opposite direction by placing the bar 78 in the pocket 80 defined by the ear 66d and pry surface 68d and applying force in the direction toward the original pipe 84 to move the coupler back onto the original pipe 84.

FIG. 6 shows the use and positioning of two couplers 12 with two pipe repair tools 10. Pipe section 82 is shown in relation to pipe repair section 86 prior to moving the coupler 12 to span both the original pipe section 82 and the replacement pipe repair section 86. Original pipe section 84 is shown in relation to repair section 86 after moving the coupler 12 to span both the pipe section 84 and the repair section 86. After each coupler 12 is moved to couple the pipe repair section 86 with original pipe sections 82 and 84, the repair tools 10 may be removed from the couplers 12 by releasing the latch mechanism 46 and removing the repair tools 10 as shown in FIG. 2.

Referring to FIGS. 1 and 3, the exemplary repair tool has outwardly projecting ears 66a and 66c, each having pry surfaces 68a and 68c on opposite sides of the cuff 14. If properly aligned, the original pipe sections 82, 84 and the replacement pipe sections 86 share a common axis 94 shown in FIG. 3. The coupler 12, closely surrounding the cuff 14, is also aligned with the pipe sections 82 and 84 and shares same axis 94. If force is applied only to one side of the repair tool 10, on ear 66a for example, the force is applied off-axis and can cock, or misalign the coupler 12 with respect to the pipe sections 82, 84, making it difficult to slide the coupler 12 on to the repair section 86. However, using two pry bars simultaneously on oppositely projecting ears 66a and 66c may help slide the coupler 12 evenly onto the replacement section 86.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A pipe repair tool for use with a coupler of the type having a first end, a second end, and a cylindrical sleeve between said first and second ends, said first and second ends of said coupler respectively having first and second outwardly projecting flanges, said repair tool comprising:
   a. a cylindrical cuff having a circular cross-section, including first and second half cuffs with semi-circular cross-sections, said cuff configured to closely enclose at least a portion of said sleeve of said coupler when said first and second half cuff are fastened together, said cuff further having a leading edge of circular cross-section at a first end of said cuff and a trailing edge of circular cross-section at a second end of said cuff such that said leading edge of said cuff is capable of engaging said first flange of said coupler;
   b. said cuff having a cylindrical outer surface including at least one outwardly projecting ear, said at least one outwardly projecting ear comprising a first leading ear located near to said leading edge of said cuff and having a force-receiving pry surface facing said trailing edge of said cuff such that force applied to said pry surface in the direction of said leading edge is capable of urging said leading edge of said cuff against said first flange of said coupler.

2. The tool of claim 1, wherein said cuff has a midline substantially equidistant from said leading edge and said trailing edge, said outer surface of said cuff further including an outwardly projecting first trailing ear located between said midline and said trailing edge of said cuff and having a pry surface facing said leading edge of said cuff, such that force applied to said pry surface of said first trailing ear in the direction of said trailing edge is capable of urging said trailing edge of said cuff against said second flange of said coupler.

3. The tool of claim 2, said cuff further including an outwardly projecting second trailing ear located on said outer surface of said cuff diametrically opposite said second trailing ear including a pry surface facing said leading edge of said cuff such that force applied to said pry surface of said second trailing ear in the direction of said trailing edge is capable of urging said trailing edge of said cuff against said second flange of said coupler.

4. The tool of claim 2 wherein said first trailing ear includes a tip directed at least partially toward said leading edge.

5. The tool of claim 2 wherein said pry surface of said first trailing ear includes a pocket having an open portion facing said leading edge.

6. The tool of claim 1, said cuff further including an outwardly projecting second leading ear located on said outer surface of said cuff diametrically opposite said first leading ear, said second leading ear including a pry surface facing said trailing edge such that force applied to said pry surface of said second leading ear in the direction of said leading edge is capable of urging said leading edge of said cuff against said first flange of said coupler.

7. The tool of claim 6, wherein said first leading ear and said second leading ear are positioned such that substantially equal force applied to said respective pry surfaces of said first leading ear and second leading ear in the direction of said leading edge is capable of urging said leading edge of said cuff evenly against said first flange of said coupler.

8. The tool of claim 1 wherein said first leading ear includes a tip directed at least partially toward said trailing edge.

9. The tool of claim 1 wherein said pry surface of said first leading ear includes a pocket having an open portion facing said trailing edge.

10. The tool of claim 1 further including a hinge joining said first and second half cuffs and enabling said half cuffs to pivot with respect to each other, and a latch releasably fastening said first and second half cuffs together to prevent said half cuffs from pivoting with respect to each other, said hinge and said latch located on said cylindrical outer surface of said tool diametrically opposite each other, said first leading ear located on said cylindrical outer surface of said cuff spaced apart from both said hinge and said latch.

11. The tool of claim 10, wherein said first leading ear is located on said cylindrical outer surface of said cuff midway between said hinge and said latch.

12. A pipe repair tool for use with a coupler of the type having a first end, a second end, and a cylindrical sleeve between said first and second ends, said first and second ends of said coupler respectively having first and second outwardly projecting flanges, said repair tool comprising:
   a. a cylindrical cuff having a first open end, a second open end and a length between said first and second open ends, said first open end defining a circular leading edge of said cuff and said second open end defining a circular trailing edge of said cuff;
   b. said cuff including first and second semi-cylindrical half cuffs having lengths corresponding to said length of said cuff and first and second ends corresponding to said first and second open ends of said cuff, each of said first and second ends of said half cuffs having a semi-circular cross-section corresponding to said leading edge and said trailing edge;
   c. each of said first and second half cuffs having first and second lengthwise edges, said half cuffs connected by a hinge at their respective first lengthwise edges and releasably fastened together by a latch at their respective second lengthwise edges such that said cuff is configured to closely enclose at least a portion of said sleeve of said coupler when said half cuffs are fastened together;
   d. said half cuff each having a semi-cylindrical outer surface;
   e. said first half cuff having at least one outwardly projecting ear on said outer surface comprising a first leading ear located near to said leading edge and spaced apart from said first and second lengthwise edges, said first leading ear having a force-receiving pry surface facing said trailing edge of said first half cuff such that force applied to said pry surface in the direction of said leading edge is capable of urging said leading edge of said cuff against said first flange of said coupler when said cuff is fastened around said sleeve of said coupler.

13. The tool of claim 12 wherein said second half cuff includes an outwardly projecting ear comprising a second leading ear located on said outer surface diametrically opposite to said first leading ear, said second leading ear having a force receiving pry surface facing said trailing edge of said second half cuff such that force applied to said pry surface in the direction of said leading edge is capable of urging said leading edge of said cuff against said first flange of said coupler when said cuff is fastened around said sleeve of said coupler.

* * * * *